United States Patent [19]

Nall et al.

[11] 4,438,227

[45] Mar. 20, 1984

[54] COMPOSITION AND METHOD OF MASKING

[75] Inventors: James B. Nall, San Diego; Jeffery J. King, Orange, both of Calif.

[73] Assignee: Ronald Jay Brahams, San Diego, Calif.

[21] Appl. No.: 432,451

[22] Filed: Oct. 4, 1982

[51] Int. Cl.$^3$ .................. C08L 1/18; B05D 1/32; B05D 5/00
[52] U.S. Cl. .................... 524/33; 524/905; 260/DIG. 24; 427/259
[58] Field of Search ............ 524/31, 33, 905; 260/DIG. 24; 106/177; 427/259

[56] References Cited

U.S. PATENT DOCUMENTS

| | | | |
|---|---|---|---|
| 2,782,127 | 2/1957 | Walker et al. | 106/177 |
| 3,421,919 | 1/1969 | Lih | 106/177 |
| 3,502,491 | 3/1970 | Orth | 427/259 |
| 3,663,278 | 5/1972 | Blose et al. | 524/33 |

Primary Examiner—John Kight, III
Assistant Examiner—Nathan M. Nutter
Attorney, Agent, or Firm—Charmasson & Holz

[57] ABSTRACT

A composition and method of application of the composition to produce masks of the type particularly useful in the manufacture of varnished electronic terminals and components is specified. The composition consists of mixing acetone, nitrocellulose, methyl isobutyl ketone (MIBK), arylsulfonamide formaldehyde resin, and tri (b-chloroethyl) phosphate, a fire retardant, under carefully controlled conditions. This masking product is applied, prior to the varnish, on an electronic part and is subjected to heating in the varnish curing oven to about 200° F. whereupon the masking product will carbonize. The resulting carbonized coating is easily removed by brushing to produce a varnish mask where the masking product was applied.

16 Claims, No Drawings

COMPOSITION AND METHOD OF MASKING

FIELD OF THE INVENTION

The field of the invention relates to the production of varnish free masks on varnished electrical parts suitable for electrical connections and terminals.

BACKGROUND OF THE INVENTION

Varnished electrical parts such as terminals and connectors are difficult to clean to enable proper electrical connections be made. Prior art techniques for producing varnish free areas include simply scraping, brushing, or sanding the hardened varnish off. Prior mask producing agents, such as grease, were not suitable to produce a useful mask or required high temperatures for carbonizing the masking composition. High varnish curing oven temperatures resulted in lengthy heating times, increased decomposition of the overlayered varnish, and degradation of electrical integrity and resistance within the part.

SUMMARY OF THE INVENTION

This invention provides a new masking composition which solves the need for a mask producing layer which may be easily and accurately applied by brush or automated means, such as screening, and will carbonize at low temperatures. A need to produce masks, i.e. areas free of varnish, on varnished electrical parts has existed. A high dielectric varnish is desirable to prevent low resistance pathways which would allow current flow or sparking in and around the electrical parts. However, a mask is useful to provide varnish free areas suitable for electrical terminals and connections. Past masking techniques are labor intensive and difficult to perform. It is an object of the invention to reduce these labor intensive techniques by providing a useful composition to easily achieve the varnish mask.

The masking composition consists of effective amounts of acetone, or other volatile solvent suitable to thin and solublize the components, nitrocellulose, arylsulfonamide formaldehyde resin (Santolite ®MHP), methyl isobutyl ketone (MIBK), and a fire retardant, tri (b-chloroethyl) phosphate (Fyrol CEF ®). The composition as formulated is flame retardant due to the Fyrol and is relatively viscous but can be easily thinned with acetone to allow facile application by brush or other means. After a short drying period an overlayer of varnish may be applied and the coated part heated in an oven to at least 200° F. whereupon the layer will carbonize without flame forming a breakable layer. Removal of the layer by brushing is easily accomplished resulting in an absence of coating and overlayered varnish where applied. An object of the new composition is producing low temperature fired masks without the necessity for lengthy oven heating or high temperatures. Another object is the safe, nonflammable and non-explosive use of said new composition to produce clean terminals and other unvarnished areas without the labor intensive prior art techniques.

DETAILED DESCRIPTION OF THE PREFERRED EMBODIMENT

The masking composition has an effective amount of nitrocellulose to carbonize at a low temperature yet not be flammable or explosive. The presently preferred formulation and manufacturing instructions are given in Example 1.

EXAMPLE 1

FORMULATION AND MANUFACTURING INSTRUCTIONS

|   |   | percent by weight |
|---|---|---|
| 1. | Acetone | 51.5 |
| 2. | Nitrocellulose RS ¼ | 28.1 |
| 3. | Methyl isobutyl ketone (MIBK) | 4.7 |
| 4. | Santolite ® MHP | 9.4 |
| 5. | Fyrol ® CEF | 6.7 |
|   |   | 100.0 |

Manufacturing procedure:

CAUTION: The NITROCELLULOSE IS EXTREMELY FLAMMABLE, AND CAN BE EXPLOSIVE IF DRIED OUT.

The solvents also are very flammable.

It is imperative that the operation be conducted with safety in mind. Do not allow smoking in the area. See that no electric sparks can get access to fumes; i.e., use explosion proof connections. We recommend use of compressed air drive pumps (diaphragm) or stirrers, with the compressor located in a remote area. If you are not afraid enough to be very cautious, a disaster may occur. However, it can be mixed and filled safely with precautions.

I. In a separate pot on a hot plate, remote from the principal nitrocellulose mixing area, combine ingredients 3 and 4. This will form a syrup. Once it is all liquid, cool it to about 100° F. and slowly add a little acetone to thin it further as it cools so that it is pourable at room temperature.

II. Meanwhile, in the main container acetone (1 above) and 2, the nitrocellulose are combined by pumping. The diaphragm pump is set so that there is good flow from the bottom of the tank and back into the top. Set the return outlet just below the level of the liquid surface to prevent undue air bubbles. Continue circulating the mixture until all the solution is clear and free of white lumps of nitrocellulose. At that time, leaving the pump on, pour the MIBK-Santolite mixture into the main batch. Then pour in the Fyrol. Continue mixing a few more minutes to ensure uniformity, and pump into cans.

When filling, make such the can lid threads are wiped very clean with solvent on a clean cloth to prevent the possibility of forming an explosive mixture in the thread area (this is not terribly probable in view of the other ingredients, but it is a sensible precaution, and it makes cans easier to open).

Immediately before filling you may wish to test the viscosity with a Zahn cup or similar device. The material may be thinned slightly with acetone. It will probably have to be thinned slightly if the stirring is done in an open container; it is better to keep the kettle covered to cut down on evaporation and reduce the hazardous fume level.

INGREDIENT SOURCES 1. and 3. available from any chemical or solvent company.

2. The nitrocellulose RS ¼ comes from Hercules, Incorporated, (213)-487-3800.

4. The Santolite ®MHP is made by Monsanto, but is is available through Chem Central. Their Los Angeles branch phase is (714)-521-7690; I believe they have a San Diego branch as well. The MHP is stocked in 60 pound pails. There is another type, Santolite MS-80% which might be more convenient, but it is only available in 55 gallon drums. If you use this, I would add one fourth more than of the MHP and cut back on the acetone. This would save the need to heat it to dissolve. Santolite consists of arylsulfonamide formaldehyde resin.

5. Fyrol ®CEF is from Stauffer Chemical Company, (213)-739-5100, and consists of tri (b-chloroethyl) phosphate.

The best mode of the invention is to apply this optimum composition by brush to the part and areas to be made unmasked. After a brief drying period an overlayer of varnish dip is applied. The part is exposed in the varnish curing oven to at least 200° F. temperature whereupon the masking coating carbonizes and forms a bubbled layer easily removed by gentle brushing. The masked areas correspond to the applied areas and are available for further processing. The removed carbon cleans the metal connector surface resulting in a clean electrical connection.

The masking product is flammable due to the solvents and care must be used to avoid breathing fumes and avoid skin contact.

While the preferred embodiment of the invention has been described, other modifications may be made thereto and other embodiments may be devised within the spirit of the invention and scope of the appended claims.

What is claimed is:

1. In the manufacture of an electrical or electronic component which includes the application of a varnish or other insulating and sealing compound to the surface of said component by either dipping, brushing or spraying method, a process, for preventing the adhesion of said compound to certain areas of said component and for conditioning them for good electrical contact, which comprises:
   prior to said application, contacting said areas with a masking hydrophobic mixture comprising essentially:
   a volatile organic solvent sufficient to solvate the mixture;
   nitrocellulose;
   a formaldehyde based resin, and
   a phosphate fire retardant;
   applying said compound to said surface;
   curing said compound and carbonizing said mixture by heating said component to at least 93° C.; and
   brushing away said carbonized mixture and overlying compound from said areas.

2. The process of claim 1 wherein the volatile organic solvent comprises volatile organic solvents of the ketone type.

3. The process of claim 1 wherein the volatile organic solvent comprises acetone and methyl isobutyl ketone.

4. The process of claim 1 wherein the formaldehyde based resin comprises arylsulfonamide formaldehyde resin.

5. The process of claim 1 wherein the phosphate fire retardant comprises tri (b-chloroethyl) phosphate.

6. The process of claim 1 wherein the nitrocellulose comprises nitrocellulose known as nitrocellulose RS ¼.

7. The process of claim 1 comprising:
   volatile organic solvents sufficient to solvate the mixture;
   nitrocellulose in a proportion by weight of the mixture between 2 and 80%;
   formaldehyde type resin in a proportion by weight of the mixture between 1 and 50%; and
   phosphate type fire retardant in a proportion by weight of the mixture between 1 and 80%.

8. The process of claim 7 wherein the nitrocellulose comprises the nitrocellulose known as nitrocellulose RS ¼.

9. The process of claim 7 wherein the formaldehyde type resin comprises the formaldehyde type resin known as arylsulfonamide formaldehyde resin.

10. The process of claim 7 wherein the phosphate type fire retardant comprises the phosphate type fire retardant known as tri (b-chloroethyl) phosphate.

11. The process claimed in claim 7 wherein said mixture comprises:
    ketone solvents selected from the group consisting of acetone, methyl ethyl ketone (MEK), methyl isobutylketone (MIBK) sufficient to solvate the mixture;
    nitrocellulose in a proportion by weight of the mixture of between 5 and 45%;
    formaldehyde type resin in a proportion by weight of the mixture between 1 and 25%; and
    phosphate type fire retardant in a proportion by weight of the mixture between 1 and 20%.

12. The process of claim 11 wherein said mixture comprises the nitrocellulose known as nitrocellulose RS ¼.

13. The process of claim 11 wherein said mixture comprises the formaldehyde type resin known as arylsulfonamide formaldehyde resin.

14. The process of claim 11 wherein said mixture comprises the phosphate type fire retardant known as tri (b-chloroethyl) phosphate.

15. The process claimed in claim 7 wherein said mixture comprises essentially:
    acetone in a proportion by weight of between 40 and 60%;
    nitrocellulose in a proportion by weight of between 10 and 40%;
    methylisobutyl ketone in a proportion by weight of between 1 and 10%;
    a formaldehyde type resin in a proportion of between 2 and 20%; and
    a phosphate type fire retardant in a proportion of between 2 and 10%.

16. The process claimed in claim 15 wherein said mixture comprises essentially:
    acetone in a proportion of 51.5% by weight;
    nitrocellulose RS ¼ in a proportion of 28.1% by weight
    methyl-isobutyl hetone in a proportion of 4.9 by weight;
    tri-(b-chloroethyl) phosphate in a proportion of 9.4% by weight; and
    arylsulfonamide formaldehyde resin in a proportion of 6.7% by weight.

* * * * *

UNITED STATES PATENT OFFICE
CERTIFICATE OF CORRECTION

PATENT NO. : 4,438,227

DATED : March 20, 1984

INVENTOR(S) : James B. Nall and Jeffery J. King

It is certified that error appears in the above-identified patent and that said Letters Patent are hereby corrected as shown below:

On the title page :
  Assignee: "Ronald Jay Brahams" should read

--Ronald Jay Brahms--.

Signed and Sealed this

Twenty-first Day of August 1984

[SEAL]

Attest:

GERALD J. MOSSINGHOFF

Attesting Officer

Commissioner of Patents and Trademarks